INVENTORS
BERNARD SPIEKER
ISRAEL L. FISCHER
BY
Constantine A. Michalos
ATTORNEY

INVENTORS
BERNARD SPIEKER
ISRAEL L. FISCHER
BY
Constantine A. Michalos
ATTORNEY

United States Patent Office 3,383,662

Patented May 14, 1968

3,383,662

ADJUSTMENT DEVICE WITH FOUR DEGREES OF FREEDOM FOR AN ELECTRO-OPTICAL SENSOR

Bernard Spieker, New Milford, and Israel L. Fischer, Harrington Park, N.J., assignors to The Bendix Corporation, Teterboro, N.J., a corporation of Delaware Filed Apr. 28, 1964, Ser. No. 363,084
9 Claims. (Cl. 340—173)

ABSTRACT OF THE DISCLOSURE

An optical memory system for digital computers whereby light from a light source is transmitted or stopped by a memory drum having transparent or opaque images on the drum and said transmitted light falling upon a readout device capable of four degrees of freedom translating the light into electrical voltages.

This invention relates to digital computer memory systems and particularly to a means for releasably mounting a magnetic pickup or electro-optical readout sensor on a supporting structure in such a manner that four degrees of adjustment can be made from an accessible position outside the supporting structure to permit the pickup or sensor of the digital computer memory system to be adjusted to the proper position in relation to a coded information inscribed on a memory drum and thereby give optimum signal output.

Heretofore, it has been the practice to use low storage density magnetic memory systems for digital computers. Sophisticated aerospace needs present a problem to the computer memory art, since the storage capacity requirements necessitate a system storage capacity not anticipated or efficiently solved by the present day computers having magnetic storage memory systems. As the program length increases with mission complexity, the common magnetic bulk memory devices cannot handle the storage capacity needed without invalidating the basic needs of an efficient computer having high storage density, fast resolution rate, small size and light weight. In the present day magnetic memory systems, the memory devices that have high storage efficiency have inherently long access time. Conversely, memory devices which have fast random access times have low bit densities and hence poor storage efficiencies. The utilization of the former devices sacrifices computational speed, and therefore, severely limits the operation of the arithmetic unit for the sake of capacity, while the use of the latter, inherently faster devices dictates that large capacity can only be obtained at the price of increased size and weight. The systems became too bulky to be applied to the aerospace field where information storage capacity in the range of one million bits of information may be desired. In addition, the present day magnetic memory drums are unsatisfactory for aerospace use because they have a disadvantage of being sensitive to stray electric and magnetic fields which caused inaccuracies, and therefore produced an unreliable permanent memory storage system.

The solution of the problem lies in providing an optical storage memory system which utilizes the combination of the desirable features of high storage efficiencies found in magnetic drums or tapes with the fast random access times found in magnetic core arrays.

Since the aerospace computer system is designed specifically for its intended application, its program, and significant portions of other stored data, are permanent in nature. This permits the substitution of optical techniques for magnetic techniques in the design of the storage memory system. The use of an optical device which has a much higher packing density and permanent storage results in a more reliable memory system. Therefore, the optical device can be made smaller in size and weight than its equivalent magnetic counterpart.

This does not invalidate the possibility that a magnetic device may not utilize this means of adjustment. The pickup or readout device may operate by magnetic or optical means. However, reference will be made to an optical device utilizing this invention but this shall not limit its application since a highly accurate magnetic device may be found to utilize the inventive features of this device.

Since the embodiment of this invention utilizes a highly accurate optical memory system, alignment of the readout device, with the optical information portion of the system becomes very critical.

Therefore, an object of this invention is to provide a means for meticulously adjusting and aligning the readout portion of an optical memory system to its information portion to give optimum signal output.

Another object of this invention is to provide adjustment of a readout device such as a magnetic pickup or electro-optical sensor in four degrees of freedom.

Another object of this invention is to provide a means of adjusting the readout device longitudinally along an information track inscribed on an optical glass information drum, for providing an adjustment in time along the information track relative to a clock track.

Another object of this invention is to provide a means of adjusting the readout device transverse of the information track.

Still another object of this invention is to adjust the readout device radially inwardly or outwardly of the optical information drum.

An additional object of this invention is to provide an adjustment of the readout device about its own axis.

A further object of this invention is to provide the readout device with means of adjustment in four degrees of freedom and further having a means of locking said device in the final adjusted position.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
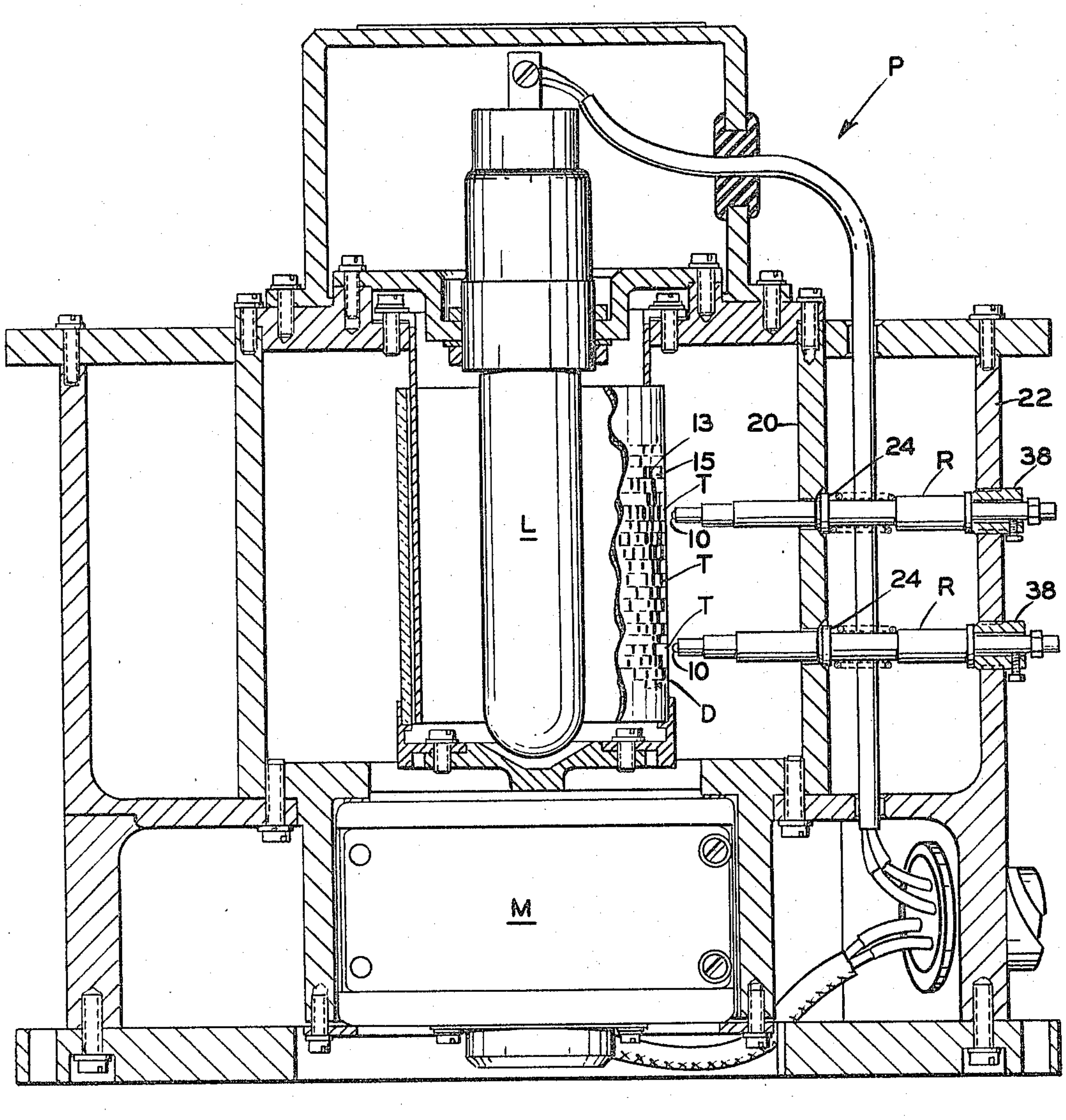
FIGURE 1 is a side view of an overall optical system with parts broken away to show a preferred embodiment of the invention attached thereon.

Referring now to FIGURE 1 of the drawings, it will be seen that readout devices, such as electro-optical readout sensors R are supported within an optical memory system P having a coded information glass drum D axially mounted on a hysteresis synchronous motor assembly M which allows for high stability, and rotational speed. Within the drum D, there is provided a light source L which illuminates the interior or the drum.

The readout devices R are supported radially of the drum D to read individual microimages or bits of coded information microphotographically etched in parallel tracks T extending circumferentially on the glass drum D.

As illustrated in FIGURE 1 of the drawings, the glass drum D, having the predetermined microimages microphotographically etched information pattern on its surface, is mechanically linked to the motor M. The drum D itself is a high precision quality optical piece and the microimages are stored in binary form on its surface as clear and opaque areas. The drum D is preferably made of lime glass, annealed to remove residual stresses and polished to a required close tolerance. The drum is microphotographically encoded by a fully automatic manufacturing process with all steps interlocked to ensure prime accuracy. The pattern comprises the circumferential parallel tracks T around the drum D, covering the length of the drum except for the mounting area. The binary digits are represented by opaque areas 13 for "ones" and transparent areas 15 for "zeros." In order to preserve this accuracy, therefore, the drum D is very accurately mechanically linked to the motor M. One means for obtaining accurate rotation is by use of the hysteresis synchronous motor M, allowing for a high stability rotational speed without slip rings or brushes. To accomplish this accuracy, the drum D is encoded with the required binary data, while it is mounted on the motor's armature to ensure concentricity of the binary pattern with the axis of rotation.

The light source L, as shown in FIGURE 1, utilizes a special incandescent lamp to supply the necessary light for the memory system readout through the drum. The readout device R comprises a photodetector such as a photodiode 12 placed behind a sapphire-plano convex lens 10 at a predetermined focal length in order that the pattern on the drum D may be magnified onto the photodiode 12 at a typical magnification of fifteen times, resulting in an electronic signal to the memory system. The drum D is then rotated between the light source L and the readout device R for either continuous or incremental rotation from a microimage 14 to another which may be an opaque area 13 or a transparent area 15.

The light source L, the lens 10, and the photodiode 12 are used to readout the stored information pattern on the drum D. The pattern on the drum D may include a clock track parallel to the information tracks T to sense the location of the drum. It should be noted that the illuminated pattern can be given a large linear magnification in an extremely short distance by the lens 10.

Figure 5:
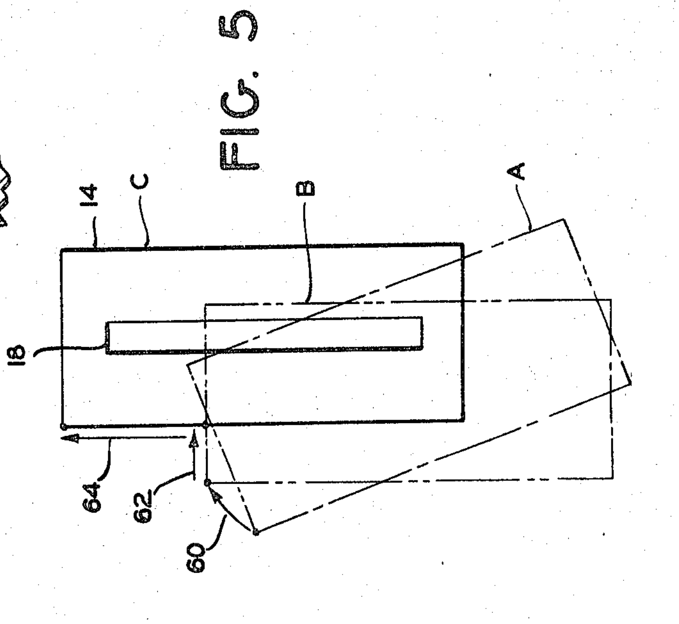
FIGURE 5 is an enlarged view of FIGURE 4 showing two projected views of a bit of information.
Figure 4:
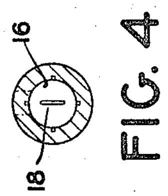
FIGURE 4 is a sectional view of the device taken substantially along line 4—4 of FIGURE 3.

As best shown in FIGURES 4 and 5, a magnified microimage 14 is focused on an optical stop 16 and through an aperture 18 on to the photodiode 12. Depending on whether a "one" or "zero," an opaque or a transparent area, respectively, is picked up by the sensor 12 to cover the sensitive area of the aperture 18 and to impinge on the photodiode, the photodiode does or does not cause a current to flow to the memory system. The drum D may be rotated between the light source L and the readhead R by means of the motor M to read the amount of coded information desired.

In this optical memory system, the high bit capacity requires a highly accurate adjustment of the readout device R in relation to the information on the glass drum D. To provide for this high accuracy, it is necessary for four degrees of adjustment freedom. This four degrees of freedom obviously is needed due to the build-up of mechanical tolerance through the machining and assembly operation.

The four degrees of freedom provided herein is as follows: First, movement of the readhead longitudinally along the information track T. That is, the lens of the readhead reading the information track is moved parallel to the information track so that a readhead that is reading a clock track may read its predetermined bit of information before or after the readhead of the information track reads its bit of information. The readhead R moves an adjusted amount circumferentially about the drum D parallel to its information track T. The second degree of movement is transverse to the information track T. That is, the second degree of freedom moves the position which the readhead reads along a line perpendicular to the information track and parallel to the axis of the drum adjacent to the surface of the drum D. This will enable the readhead to be aligned with its correct information track. The third degree of freedom positions the readhead radially inwardly or radially outwardly of the position of the drum, thus insuring focus of the microimages 14 onto the photodiode 12, providing for an optimum readout signal. The fourth degree of freedom provides for the adjustment of the readout sensor about its own axis to provide for the vertical alignment of the rectangular aperture 18 with the vertical extending rectangular bits of information as best shown in FIGURE 5.

Figure 2:
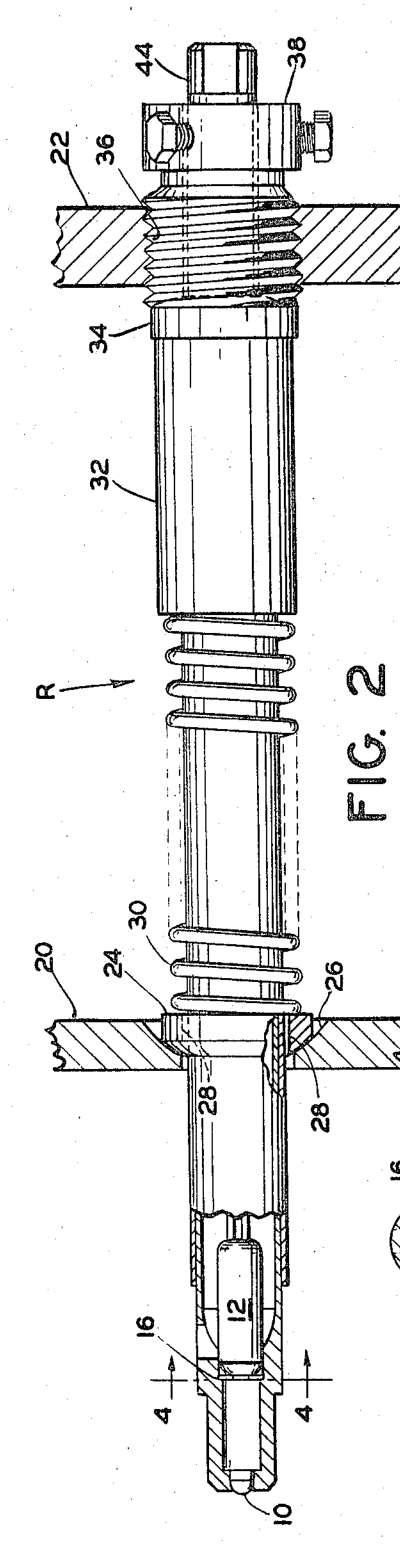
FIGURE 2 is an enlarged side view of the readout device with the adjusting means in accordance with the preferred embodiment of the invention shown in FIGURE 1.
Figure 3:
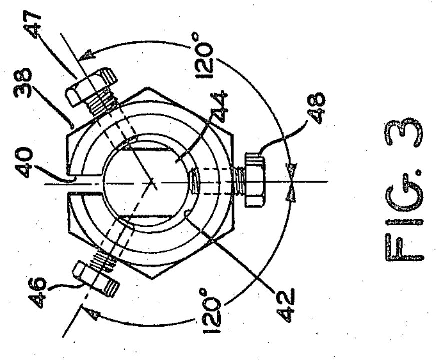
FIGURE 3 is a detailed end view of the invention shown in FIGURE 2.

Referring more specifically to FIGURES 2 and 3, the main adjustment assembly in which the readhead R is affixed is shown. The portion of the memory device which holds the readhead comprises of two concentric cylinders 20 and 22. The inner cylinder 20 is approximately one inch from the outer cylinder 22. A hemispherical washer 24 is provided within a complementary aperture 26 holding the readhead R rigidly only in regard to its movement transversely of the drum D while permitting movement of the readhead R radially inwardly or radially outwardly of the drum D. The hemispherical washer 24 provides an axial opening 28 through which the readhead R protrudes.

Pressing the hemispherical washer 24 against the aperture 26 is a spring 30. The other end of the spring presses against a sleeve 32 which, in turn, is supported by a flange 34 integral to the aft end of the readhead R.

The readhead R is initially insertable through an opening 36 located in the outer cylinder 22. A bushing 38 is threaded within the opening 36 to hold the readhead R within the cylinders 20 and 22. It should be noted that the opening 36 is somewhat larger than the flange 34 to allow the flange to enter through it in the initial installation of the readhead R within the overall optical system P.

As can be seen from FIGURE 3, the bushing 38 is provided with a slit 40 which permits the bushing 38 to flex and thereby increase or decrease its diameter as hereinafter more fully explained. It should be also noted that the readhead R is translated radially inwardly or outwardly of the drum D, and therefore the distance from the lens 10 to the tracks T is varied. This provides for the fourth adjustment herein mentioned, to focus the lens 10 onto the coded information pattern located in the surface of the drum D. Actually, the adjustment is made by examining the electrical output on an instrument such as an oscilloscope of the readhead R while the memory unit is in operation.

To provide for the other two adjustment, the longitudinal and the transverse movement of the lens 10 relative to the track T, an opening 42 is located on the bushing 38 designed larger than an end portion 44 of the readhead R which goes through the opening 42. Lateral adjustment within this opening 42 is provided by three bolts 46, 47, and 48 which are capable of moving the end portion 44 of the readhead R in any direction by selectively loosening or tightening various combinations of the bolts. Adjusting these three bolts 46, 47, and 48 causes the readhead R to pivot about a center of the hemispherical washer 24, within the aperture 26, hence causing the lens 10 to move adjacent the surface of the drum D in any location within a datum circle, thereby providing for the adjustment in the longitudinal and transverse direction relative to the track T.

The fourth degree of freedom is provided by uniformly loosening all of the three screws 46, 47, and 48 to prevent loss of previous adjustments after they have been fixed. Then the entire readhead R may be rotated on its longitudinal axis to provide the optimum electrical signal reading by an instrument such as an oscilloscope, not shown.

When the selective adjustment of the three bolts is completed and the oscilloscope displays maximum reception of the signal, the readhead is locked in place. That is, the slit 40 permits a certain amount of spring tension to lock the readhead into position after the bolts 46, 47, and 48 are screwed in tight against the end portion 44 of the readhead R.

Therefore, as provided by this invention, using the four degree of freedom adjustment for the readhead R magnifies a bit of information onto an optical stop 16, as shown in FIGURES 4 and 5.

Then, assuming that the bit of information 14 is initially projected in the position A, shown in phantom, the readhead R may be rotated about its own axis to rotate the projected image of the bit of information as shown by arrow 60 to a second position B shown in FIGURE 5. The image may then again be moved longitudinally in relation to the track T as shown by arrow 62 and then transversely to that track T as shown by arrow 64 to locate it in its final position of adjustment C, by the loosening and tightening of the bolts 46, 47, and 48 as herein more fully described. The final tightening of the bolts will lock the readhead R in its optimum position to read its selective information track T, by permitting the microimages 14 to be sensed by the photodiode 12 located adjacent to the stop 16 as best shown in FIGURE 1.

As provided in the copending application Ser. No. 336,487, filed Jan. 8, 1964, by Walter W. Lee et al., and assigned to The Bendix Corporation, the same assignee as the present invention, this unit may then be used in the operation of the optical memory system wherein the glass drum D rotates and the information pattern inscribed on it, in conjunction with the internal light source L, causes the amount of light falling on the readhead R to vary. This is introduced by the photodetector 12 to an electronic amplification to be made available to a computer, or whatever other ultimate consumer may be present.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A digital computer memory system comprising, a memory drum having coded information inscribed on its surface and a clock track inscribed on its surface, first and second elongated readout devices extending radially outwardly of said drum, the first readout device for sensing the inscribed clock track and the second readout device for sensing the inscribed coded information, inner and outer spaced concentric cylinders encircling said drum and supporting said readout devices at two longitudinal positions of each readout device, and means connecting the outer cylinder of said concentric cylinders to each of said readout devices for individual linear radial actuation of said readout devices relative to said drum to determine an optimum signal for each readout device whereby the first readout device senses said clock track for indexing the drum so that the desired inscribed coded information may be sensed by the second readout device.

2. A digital computer memory system comprising, a memory drum having coded information inscribed on its surface, an elongated readout device extending radially outward of said drum, inner and outer spaced concentric cylinders encircling said drum and supporting said readout device at two longitudinal positions of the readout device, means connecting the outer cylinder of said concentric cylinders to said readout device for linear radial actuation of said readout device relative to said drum to determine thereby an optimum signal, a hemispherical washer having an opening defined axially therethrough for slidably supporting said readout device therein, and said inner cylinder defining a complementary hemispherical aperture for supporting said washer for holding the washer rigidly only in regard to its movement transverse to said drum while permitting the readout device linear radial actuation.

3. The structure as defined by claim 2 wherein said means connecting the outer cylinder to said readout device is a bushing threadable within said outer cylinder for actuation of the readout device towards or away from said drum, and a spring extending between said washer and said bushing for resiliently supporting said readout device between said concentric cylinders.

4. The structure as defined by claim 3 further comprising a plurality of bolts spaced equally around and extending radially inwardly of said bushing to engage the aft end portion of said readout device, said bushing defining an opening substantially larger than the outside diameter of the readout device for transverse movement of said readout device relative to said bushing by said bolts to thereby move the front end of said readout device transverse relative to said drum and to retain said readout device after the optimum signal has been derived.

5. The structure as defined by claim 4 wherein said bushing is provided with a longitudinally extending slit thereby producing a resilient locking arrangement between said readout device and said bushing upon the extension of the bolts radially inwardly in engaging the aft end of the readout device to lock the readout device within said bushing.

6. A digital computer optical memory system comprising a light source, an optical sensor extending radially outwardly of said light source, an optical information drum circumferentially surrounding said light source and interposed between said light source and said sensor, said sensor further comprising a lens adjacent said drum for receiving light signals therethrough from said light source controlled by microimages contained in circumferential parallel tracks around the surface of said drum, a photodetector for receiving said light signals and converting them into electronic signals to read the microimages on the surface of said drum, a pair of spaced concentric cylinders encircling said drum and supporting said readhead at two longitudinal positions of said sensor, means for resiliently supporting the readhead against the inner cylinder of said concentric cylinders and connecting the outer cylinder of said concentric cylinder for linear actuation of said sensor towards and away from the microimages on said drum, operable to focus said microimages by said lens to produce thereby optimum optical signals to said sensor, and a hemispherical washer supported by a complementary hemispherical aperture defined within the inner concentric cylinder, said washer having an axial opening thereby permitting radial movement of said sensor relative to said drum through said washer while confining any transverse movement of the sensor relative to said drum.

7. In a digital computer memory system having a light source, a readout device extending radially outwardly of the light source, and an information drum circumferentially surrounding the light source and interposed between the light source and the readout device, the readout device further having a lens for receiving light signals therethrough from the light source, controlled by microimages contained in circumferential parallel tracks around the surface of said drum and directing the light signal through the readout device for converting them into electronic signals for reading the microimages on the surface of the drum, comprising a hemispherical washer surrounding the inner longitudinal portion of said readout device, an inner cylinder concentrically encircling said drum and supporting said readout device through said hemispherical washer within a complementary hemispherical aperture on the circumference of said inner cylinder, said readout device extending radially outwardly of the drum with the lens facing the drum, an outer cylinder spaced radially outwardly of said inner cylinder and concentric with said drum and said inner cylinder, a spring extending between said outer cylinder and said hemispherical washer for retaining said readout device against the inner cylinder of said concentric cylinders, and means connecting the outer cylinder of said concentric cylinder for linear actuation of the readhead radially towards and radially away from the microimages on said drum whereby the microimages may be focused by the lens within the readout device to produce thereby optimum optical signals to the readout device.

8. The structure as defined by claim 7 wherein said connecting means connecting said outer cylinder is a bushing threadable within said outer cylinder for actuation of the readout device towards and away from said drum to focus the microimages on said drum through said lens onto said photodetector of said readout device.

9. The structure as defined by claim 8 wherein the end portion of said readout device is diametrically smaller than an inside diameter of said bushing, and further comprising a plurality of bolts spaced equally around and extending radially inwardly of said bushing to engage and move the end portion of said readout device tangently in any direction of the outer cylinder and thereby move the lens transverse to or longitudinally to the circumferential tracks on said drum and to engage the aft end portion of the readout device and lock it in position after an optimum signal has been derived.

References Cited

UNITED STATES PATENTS

| | | | |
|---|---|---|---|
| 3,106,700 | 10/1963 | Newberry ---------- | 340—173 |
| 3,229,047 | 1/1966 | Simpson ------------ | 340—173 |

TERRELL W. FEARS, *Primary Examiner.*